Oct. 10, 1939.  E. F. STEINERT  2,175,927

WELDING TRANSFORMER

Filed March 12, 1936

WITNESSES:
Michael Stark
C. F. Bryant

INVENTOR
Emil F. Steinert.
BY Ezra D. Savage
ATTORNEY

Patented Oct. 10, 1939

2,175,927

UNITED STATES PATENT OFFICE 2,175,927

WELDING TRANSFORMER

Emil Steinert, Sharon, Pa., assignor to Westinghouse Electric & Manufacturing Company, East Pittsburgh, Pa., a corporation of Pennsylvania Application March 12, 1936, Serial No. 68,439

7 Claims. (Cl. 219—8)

My invention relates to alternating-current welding systems, and it has particular relation to systems which utilize a transformer and other apparatus to maintain the welding current within given limits and to adjust the current range which said limits define.

Generally stated, the object of my invention is to lighten the weight, reduce the size and otherwise improve induction-type apparatus suitable for the above service.

A more specific object is to reduce the losses and minimize the stray magnetic fields which are incident to such apparatus.

Another object is to combine into a single unit the energy-supply transformer and the main regulating reactor.

A still further object is to provide an improved current-adjusting scheme which affords steps of equal increments over the entire welding range.

Figure 1:
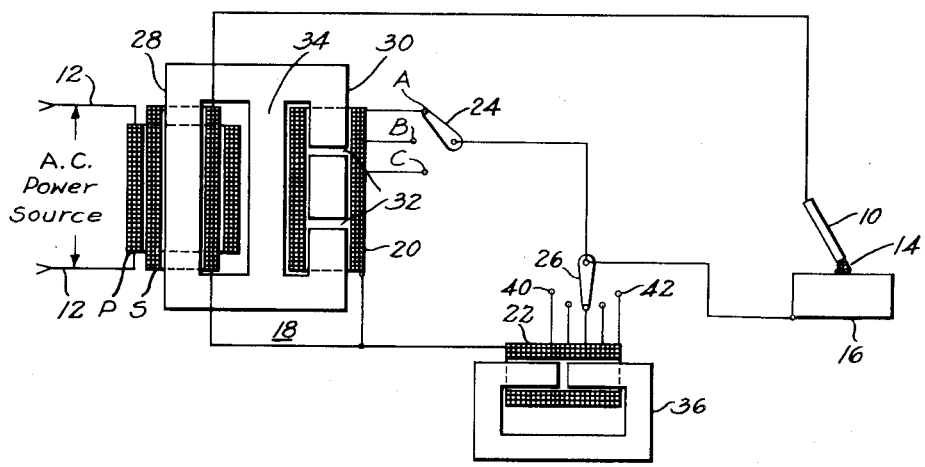
Figure 2:
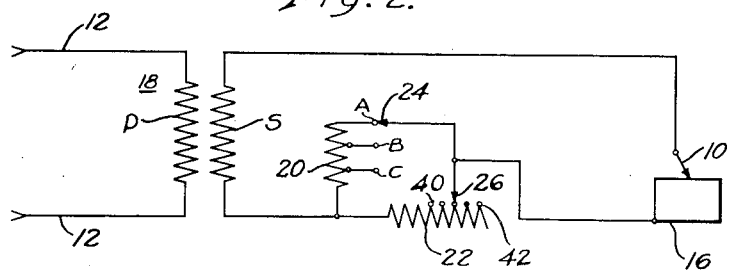

My invention itself, together with additional objects and advantages thereof, will best be understood through the following description of a specific embodiment when taken in conjunction with the accompanying drawing, in which, Figure 1 is a diagrammatic representation of apparatus and circuits illustrating welding-current supply equipment incorporating the several improved features of my invention, and Fig. 2 is a winding-development diagram of the equipment cf Fig. 1.

Referring to the drawing, I have there illustrated a welding electrode 10 adapted to be supplied from an alternating-current power source 12 with current suitable to sustain an arc 14 (shown in Fig. 1 only) between the end of the electrode and the metal or other work 16 upon which a weld is to be made.

Included in the supply circuit is a transformer 18 which, by means of primary and secondary windings P and S, lowers the voltage and raises the current of the energy supplied to the electrode, and performs the further function of electrically insulating the electrode 10 and the work 16 from the higher voltage supply circuit 12. The system also includes apparatus, in the form of a pair of parallel-connected reactor windings 20 and 22, adapted to keep the welding current within given limits as the length of the arc 14 may be varied by shift of electrode position. Switches 24 and 26 associated with tapped connections from these windings serve to change the current setting as differences in the character or type of the work 16 and the size of the electrode 10 may make desirable.

In accordance with my invention, I combine into a single unit, the energy-supply transformer 18 and the main current regulating and adjusting reactor winding 20. To effect this combination, I utilize the illustrated three-legged core structure, on one of the outer legs 28 of which the primary and secondary windings P and S are carried, and on the other outer leg 30 of which the main reactor winding 20 is supported in a manner that it completely encloses the one or more air gaps 32 with which this leg is preferably provided. The central leg 34 of the structure is, of course, common to the magnetic circuits defined by the two outer legs.

It will be noted that the current supplied to electrode 10 from the secondary winding S divides itself between the main reactor winding 20 and the winding 22 of an auxiliary reactor which also is associated with a magnetic core 36. The effect of the illustrated combination is to maintain the current in the welding circuit within given limits, regardless of the length and character of the arc 14. This approach to constant current results from the fact that the impedance of the circuit through which power source 12 supplies the welding current is comparatively high as compared with the range of impedance variation of the arc 14.

In order to raise the current setting of the equipment, switch 24 may be moved downwardly from stationary contact A, representing the lowest setting, to contact B, which corresponds to an intermediate value of current, and thence to contact C, which affords the highest range of current values. Within each of these ranges still finer adjustment may be effected by shifting the position of switch 26 along the taps of auxiliary winding 22. Advancement to the left to tap 40 effects an increase in current, while movement to the right or tap 42 lowers the current.

By means of the parallel reactor scheme shown, current steps of nearly equal increments over the entire welding range are afforded. This represents a distinct advantage over prior art schemes which give equal percent increments resulting in too fine an adjustment at the lower end of the range, and too coarse an adjustment at the upper end.

The illustrated combination into a single unit of the main transformer and the main reactor 20 results in an appreciable lightening and renders much more compact this major portion of the welding system equipment. Because of the service of central core leg 34 as a part of the magnetic circuits of both of the two outer legs 28 and 30, a very economical use of core material is achieved, which further is enhanced by comparatively balanced magneto-motive forces in the structure during operation.

By mounting the main reactance winding 28 around the core leg 30 in such a manner that it completely encloses the one or more air gaps 32, the possibility of high stray magnetic leakage fields is largely eliminated. This not only reduces power losses but also permits the use of a small compact metal housing (not shown) around the equipment.

While in practice the alternating-current arc welder just described is, for design reasons, best adapted to the smaller current ratings (in the neighborhood of 100 amperes), it will, of course, be understood that the scheme is not exclusively so limited but may with satisfaction also be applied to the higher current ratings. In the system illustrated, taps A, B and C may, for example, provide for high, medium and low settings of 150, 100 and 50 amperes, while the taps associated with auxiliary winding 22 may sub-divide each of these major current ranges into five equal divisions.

Obviously, the range may be doubled by dividing the primary winding P into two equal sections (not shown) and arranging in well-known manner to connect these either in series or in parallel. Also, instead of using separate primary and secondary windings P and S, these may be combined into a single auto transformer winding in situations wherein it is not important that the welding circuit be electrically insulated from the power supply circuit.

Although I have shown and described certain specific embodiments of my invention, I am fully aware that many modifications thereof are possible. My invention, therefore, is not to be restricted except insofar as is necessitated by the prior art and by the scope of the appended claims.

I claim as my invention:

1. In an electric welding system, a supply circuit including a transformer having energy-transfer and current-regulating windings associated with a common core structure and a structurally-separate auxiliary reactor connected in parallel-circuit relation with said regulating winding.

2. In a circuit through which an alternating-current source of power may supply current to a load, the combination of a transformer comprising a core structure having three legs, energy-transfer windings carried by one of said legs and an auxiliary winding surrounding another leg, a reactor connected in parallel-circuit relation with said auxiliary winding, and means for passing through said connection the current supplied by the transformer to the load whereby to hold said current within predetermined limits.

3. In a circuit through which an alternating-current source of power may supply current to an electrode, the combination of a transformer comprising a core structure having three legs, energy-transfer windings carried by one of said legs and an auxiliary winding surrounding another of the legs, a reactor connected in parallel-circuit relation with said auxiliary winding, means for passing through said connection the current supplied by the transformer to the electrode whereby to hold said current within predetermined limits, and means for adjusting the portions of said reactor and auxiliary winding active in said connection whereby to alter the magnitude of said limits.

4. In an electric welding system, in combination, a transformer having a primary winding, a secondary winding and a regulating winding, an alternating-current source of power connected to supply energy to said primary winding, a load circuit connected to be supplied with alternating current from said secondary winding and including said regulating winding, and an auxiliary reactor connected in parallel circuit relation with said regulating winding.

5. In an electric welding system, in combination, a transformer having a primary winding, a secondary winding and a regulating winding, an alternating-current source of power connected to supply energy to said primary winding, an electrode circuit connected to be supplied with alternating current from said secondary winding and including said regulating winding, and an auxiliary reactor connected in parallel circuit relation with said regulating winding, means for varying the effective reactance of said regulating winding and means for varying the effective reactance of said auxiliary reactor.

6. In an electric welding system, in combination, a transformer unit comprising a multiple leg core having power translating windings on one leg and a regulating reactor winding on another leg, an auxiliary reactor, and an electrode circuit supplied with energy from said translating windings and including said regulating winding and said auxiliary reactor winding connected in parallel circuit relation.

7. In an electric welding system, in combination, a transformer unit comprising a multiple leg core having power translating windings on one leg and a regulating reactor winding of relatively large reactance on another leg, an auxiliary reactor of relatively small reactance, and an electrode circuit supplied with energy from said translating windings and including said regulating winding and said auxiliary reactor winding connected in parallel circuit relation, said regulating winding being provded wth taps for varying the effective number of winding turns in said circuit arranged to control the output current of said circuit in relatively large steps, and said auxiliary winding being provided with a plurality of taps for varying the effective number of winding turns thereof included in said circuit arranged to control the output current of said circuit in relatively small steps,

EMIL STEINERT.